US011944981B2

(12) United States Patent
Köpf et al.

(10) Patent No.: US 11,944,981 B2
(45) Date of Patent: Apr. 2, 2024

(54) CRUSHER

(71) Applicant: Kleemann GmbH, Göppingen (DE)

(72) Inventors: Reiner Köpf, Gingen an der Fils (DE); Steffen Häberle, Herbrechtingen (DE)

(73) Assignee: Kleemann GmbH, Göppingen (DE)

( * ) Notice: Subject to any disclaimer, the term of this patent is extended or adjusted under 35 U.S.C. 154(b) by 254 days.

(21) Appl. No.: 17/150,688

(22) Filed: Jan. 15, 2021

(65) Prior Publication Data

US 2021/0229110 A1 Jul. 29, 2021

(30) Foreign Application Priority Data

Jan. 27, 2020 (DE) ..................... 10 2020 101 863.0

(51) Int. Cl.

*B03C 1/22* (2006.01)
*B02C 21/02* (2006.01)
*B02C 23/10* (2006.01)

(52) U.S. Cl.

CPC .............. *B03C 1/22* (2013.01); *B02C 21/026* (2013.01); *B02C 23/10* (2013.01); *B03C 2201/20* (2013.01)

(58) Field of Classification Search

CPC ... B66D 1/20; B66D 1/72; B66D 3/12; B66D 3/18; B03C 1/22; B03C 2201/20; B02C 21/026; B02C 23/10

See application file for complete search history.

(56) References Cited

U.S. PATENT DOCUMENTS 5,593,138 A * 1/1997 Zaguroli, Jr. ............ B66D 3/18 254/288
10,376,899 B2 8/2019 Horiguchi et al.

(Continued)

FOREIGN PATENT DOCUMENTS

CN 2114649 U * 9/1992
CN 2114649 U 9/1992

(Continued)

OTHER PUBLICATIONS

European Patent Office Search Report for corresponding application No. 20213770.9, dated Jun. 29, 2021, 8 pages.

Office Action in corresponding German patent application No. 10 2020 101 863.0, dated Dec. 2, 2020, 8 pages (not prior art).

China Office Action for corresponding patent application No. 2023060101792640, dated Jun. 1, 2023, 8 pages (not prior art).

(Continued)

*Primary Examiner* — Jacob S. Scott
*Assistant Examiner* — Miraj T. Patel
(74) *Attorney, Agent, or Firm* — Lucian Wayne Beavers; Patterson Intellectual Property Law, PC

(57) ABSTRACT

The invention relates to a crusher (10), in particular a rock crusher, having a crusher unit (40), to which a band conveyor unit (60) having an endlessly circulating band conveyor is indirectly or directly assigned, wherein a magnetic separator (70) having a magnet (79) is held in the area of the band conveyor unit (60) above the band conveyor in the direction opposite from the direction of gravity, and wherein an adjustment unit (80) is provided, which can be used to change the height of the magnet (79) above the band conveyor. To enable the reliable operation of such a crusher, it is provided according to the invention that the magnetic separator (70) is suspended from at least two limp ties (81, 82, 84, 85), and that the limp ties (81, 82, 84, 85) can be adjusted by means of at least one actuator unit (90) to change the height of the magnet (79).

17 Claims, 6 Drawing Sheets

(56) References Cited

U.S. PATENT DOCUMENTS

| | | | | |
|---|---|---|---|---|
| 2003/0182997 | A1* | 10/2003 | Williams | G01N 1/08 73/863.53 |
| 2005/0173570 | A1* | 8/2005 | Tanaka | B02C 25/00 241/36 |
| 2006/0070922 | A1* | 4/2006 | LaVeine | B07B 9/00 209/231 |
| 2009/0314693 | A1 | 12/2009 | Nakayama et al. | |
| 2017/0198726 | A1* | 7/2017 | Worley | F15B 15/06 |
| 2019/0002251 | A1* | 1/2019 | Resch | B66C 19/007 |

FOREIGN PATENT DOCUMENTS

| | | | |
|---|---|---|---|
| CN | 201560082 | U | 8/2010 |
| CN | 205308557 | U | 6/2016 |
| CN | 205527299 | U | 8/2016 |
| CN | 105983483 | A | 10/2016 |
| CN | 205731608 | U | 11/2016 |
| CN | 109534178 | A | 3/2019 |
| CN | 109570029 | A | 4/2019 |
| JP | 07171436 | A | 7/1995 |
| JP | 08168690 | A | 7/1996 |
| KR | 100849520 | B1 | 7/2008 |

* cited by examiner

CRUSHER

CROSS-REFERENCES TO RELATED APPLICATIONS

This application claims benefit of German Patent Application No. 10 2020 101 863.0, filed Jan. 27, 2020, and which is hereby incorporated by reference.

BACKGROUND OF THE INVENTION

1. Field of the Invention

The invention relates to a crusher, in particular a rock crusher, having a crusher unit, to which a band conveyor unit having an endlessly circulating band conveyor is directly or indirectly assigned, wherein a magnetic separator having a magnet is held in the area of the band conveyor unit above the band conveyor in the direction opposite from the direction of gravity, and wherein an adjustment unit is provided, which can be used to change the height of the magnet or magnetic separator above the band conveyor.

2. Description of the Prior Art

Crushers for crushing rock material or other mineral raw materials are known in various designs. Such crushers usually have a feed hopper, into which the material to be crushed can be fed. From the feed hopper, the material is routed to a crusher unit. Typical crusher units are known as rotary impact crushers, jaw crushers or cone crushers. In the crusher unit, the material is crushed to the desired particle size. The crushed material leaves the crusher unit and is usually removed via a crusher discharge belt and, where applicable, fed to a band conveyor unit. The band conveyor unit typically has an endless circulating band conveyor. The band conveyor is used to remove the crushed material from the working area of the crusher unit and to pile it onto a rock pile or to route it to a further process step.

The crushers are often used for crushing steel-reinforced concrete or demolition material having metallic impurities. The crushed rock material then also contains such ferromagnetic metal particles. These should not be added to the rock pile. They therefore have to be separated from the mass flow of crushed rock material. Magnetic separators suspended above the band conveyor are used for this purpose.

Such a magnetic separator is known from U.S. Pat. No. 7,905,342 B2, for instance. The magnetic separator has a circulating belt conveyor to which a magnet is assigned. The conveying direction of the circulating belt conveyor is oriented transversely to the conveying direction of the band conveyor, in particular at an angle greater than 30° thereto. When ferromagnetic material is transported on the band conveyor, the magnet of the magnetic separator attracts that material. The belt conveyor then conveys the attracted material out of the working area of the band conveyor for separation.

If larger quantities of ferromagnetic material accumulate in the known crushers, undesirable jams can sometimes occur at the magnetic separator. This will affect the free flow of material on the conveyor and may cause rock material to unintentionally fall off the sides of the conveyor. Sometimes such jams also result in a longer machine downtimes. The operating personnel then has to laboriously remove the jam at the magnetic separator to restore the proper operating condition of the crusher. In addition, removing the jam is an increased safety risk for the operator.

SUMMARY OF THE DISCLOSURE

The invention addresses the problem of providing a crusher of the type mentioned above, which provides improved reliability of operation and occupational safety.

The problem of the invention is solved in that the magnetic separator is suspended from at least two limp ties, and in that the limp ties can be adjusted by means of at least one actuator unit to alter the height of the magnet.

Based on this arrangement, the magnetic separator can be optimally aligned to the various applications in relation to the band conveyor. This can be easily done based on the solution according to the invention. For this purpose, only the actuator unit has to be operated in order to vary the height of the magnetic separator. This conversion is simple and can be performed without major machine downtimes. For instance, it may also be provided that the adjustment of the magnetic separator is supported by an external force, in particular using a hydraulic system or an electromotive adjustment of the actuator unit. Then, the operating personnel will not be exposed to much physical strain. The adjustment can be used to optimally assign the magnetic separator to the band conveyor, adapted to the individual application. That in itself significantly reduces the risk of jams forming.

If, however, ferromagnetic material still accumulates on the magnetic separator during operation, the limp ties permit the unit bearing the magnet to oscillate. Surprisingly, it has turned out that this almost completely prevents any jams from forming at the magnetic separator and makes for an uninterrupted operation.

In addition, it has been shown that this pendulum option significantly reduces the force acting on the unit bearing the magnet, resulting in an extended service life.

According to a preferred variant of the invention it can be provided that the actuator unit has a synchronization device having synchronization means, wherein the synchronization means couple the ties to each other in a positive and/or non-positive manner for synchronized motion. This measure ensures that the coupling points of the ties of the magnetic separator are raised or lowered synchronously in order to achieve a uniform adjustment of the magnetic separator. Preferably, this can also be used to effect a parallel adjustment motion of the magnet in relation to the band conveyor below.

Particularly preferably the ties are routed via a rotatably mounted deflector for synchronizing their motions. Such deflectors can be formed, for instance, by shafts, gear wheels, sprockets or other rotatably mounted rotating parts. In particular, standardized components can be used, which significantly reduces the cost of parts and assembly.

According to a possible variant of the invention it can be provided that the magnetic separator comprises at least two suspensions, which are spaced apart from each other and to each of which a tension strand of a tie is connected using a coupling element. The points of application of the ties on the magnetic separator are also spaced apart via the spacing of the suspensions. If motion synchronization, as described above, is implemented, these points of application can be adjusted uniformly. Of course, it is also conceivable that no uniform adjustment, but deliberately differing adjustment paths are implemented for the points of application. This can be used to influence the motion behavior of the magnetic separator. This can also be achieved using an appropriately adapted synchronization device.

If synchronization is provided, it can be provided that both tension strands are routed to the synchronization device, that the tension strands are routed via individually assigned deflectors, that the tension strands merge indirectly or directly into holding segments downstream of the deflectors, that at least one of the retaining segments is coupled to an actuator of the actuator unit, and that the deflectors are coupled to each other by a synchronization means. This results in a particularly simple design.

According to a variant of the invention, it may further be provided that the synchronization means preferably comprises at least one shaft. It is also conceivable that the synchronization means is preferably formed, at least in certain areas, by a strand segment of one of the limp ties.

It is conceivable that at least three tension strands of tension mechanisms, preferably four tension strands, are provided, each of which is coupled at a point of application to the magnet unit bearing the magnet.

Two of these tension strands can, for instance, be synchronized using a shaft and the at least one further tension strand can additionally be synchronized with the first two tension strands via a strand segment of one of the limp ties. I.e., no further component is required for the second synchronization and also all tension strands are synchronized with each other.

Particularly preferably, four tension strands are provided, wherein two tension strands are synchronized with each other via one shaft each. The two further tension strands are each coupled and synchronized with a strand segment of a limp tie.

When selecting the suspensions by means of which the tension strands are coupled to the magnetic separator, it is recommended that the magnetic separator comprises at least two suspensions arranged at a distance from each other transversely to the conveying direction of the band conveyor, and/or that the magnetic separator comprises at least two suspensions arranged at a distance from each other in the conveying direction of the band conveyor.

For a 4-point suspension, a reliable suspension is achieved permitting a defined pendulum behavior.

The connection of the actuator unit to the adjustment unit is achieved in a simple manner if it is provided that at least two retaining segments of the two limp ties are connected to a connector of the actuator unit.

Within the scope of the invention, the actuator unit can be designed such that at least one hydraulic unit having a cylinder and a piston adjustably guided therein is provided as the actuator unit, wherein a piston rod is connected to the piston, and that the piston rod or the cylinder is coupled to the adjustment unit by means of a mount. It is also conceivable to use an actuator unit having a hydraulic rotary drive as actuator, which hydraulic rotary drive is coupled to the adjustment unit.

Instead of the hydraulic unit, an electric drive unit, in particular an electric rotary drive or an electric linear drive, can also be used as actuator.

If a motion synchronization system is used, as mentioned above, the use of a hydraulic unit may suffice. The motion synchronization ensures that the tension strands move in a coordinated manner relation to each other.

Advantageously, however, two hydraulic units are provided, wherein the mount of the first hydraulic unit is coupled to a retaining segment of a tie and the mount of the second hydraulic unit is coupled to a retaining segment of a further tie. This not only allows the hydraulic units to be smaller in size, but also renders them much more cost-effective. In addition, redundancy can be implemented in this way. If one hydraulic unit fails, the second hydraulic unit continues to provide the operation and occupational.

According to a variant of the invention it can also be provided that the hydraulic units are hydraulically synchronized such that the pistons of the two hydraulic units can be adjusted to move synchronously. In this case, there is no need for an additional motion synchronization in the area of the adjustment unit.

For instance, all or some of the limp ties may be formed by ropes. The use of steel cables is conceivable here. It is particularly preferable, however, that at least some of the limp ties are formed by chains, in particular link chains, preferably roller chains or round link chains, and that further preferably the deflector(s) is/are formed by sprockets. Such chains can easily be positively coupled to each other in the area of their chain links. Chains are available inexpensively in bulk and are sufficiently stable for the application according to the invention. If toothed wheels are used as deflectors, the motion of the chains can be easily synchronized.

According to a preferred variant of the invention, it can be provided that the magnetic separator has two supports which are arranged at a distance from each other in the conveying direction of the band conveyor of the band conveyor unit, that deflector elements are mounted on the supports, which deflector elements are used to guide an endlessly circulating belt conveyor of a conveying device such that the transport direction of the belt conveyor extends transversely to the conveying direction of the band conveyor of the band conveyor unit, that the belt conveyor forms two strands between the deflector elements and that the magnet is arranged in the area between the two strands.

Once the position of the magnetic separator has been set, within the scope of the invention the actuator alone suffices to secure this position. Additionally or alternatively, however, it may also be provided that the adjustment position of the magnetic separator is secured by means of an additional locating element. In this way, the actuator unit is unloaded. Preferably, it may be provided that the locating element is formed as a chain, in particular as a link chain, which is attached to the magnetic separator on the one hand and is adjustably attached to a locking element of the machine frame of the crusher on the other hand. Here, the chain again forms a simple component which ensures the reliable transfer of the weight of the magnetic separator in the set position.

Within the scope of the invention, the actuator unit can have a shaft or roller, on which the two limp ties for adjusting the vertical position of the magnet can be wound, or the actuator unit can have two shafts or rollers on each of which one of the limp ties for adjusting the vertical position of the magnet can be wound.

BRIEF DESCRIPTION OF THE DRAWINGS

The invention is explained in greater detail below based on an exemplary embodiment shown in the drawings. In the Figures.

DETAILED DESCRIPTION

Figure 1:
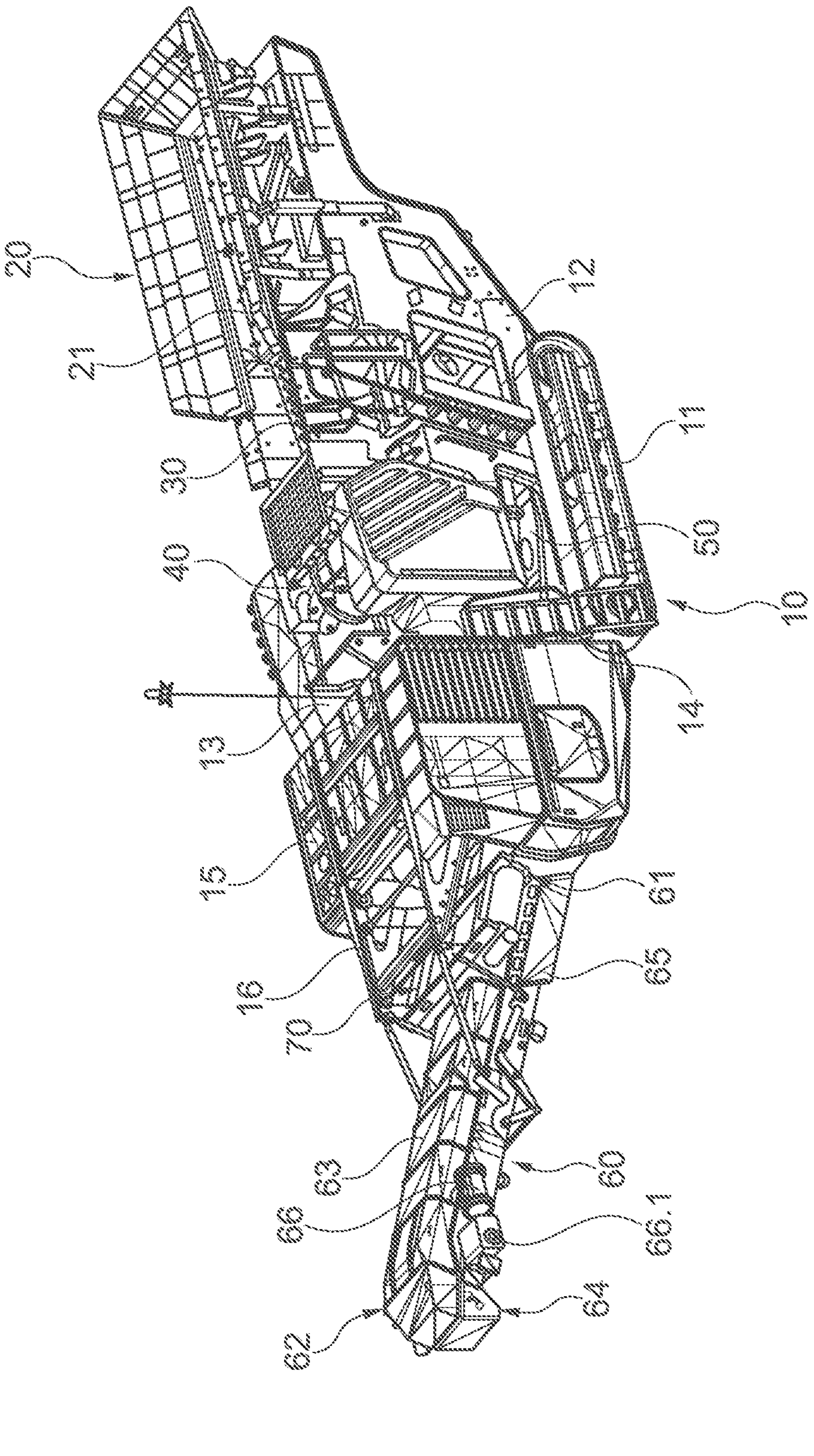
FIG. 1 shows a perspective view of a crusher.

FIG. 1 shows a crusher 10 for crushing mineral material. The crusher 10 has a machine frame 12, which is supported by two undercarriages 11, in particular two crawler tracks. The machine frame 11 has a working area 13, which can be accessed via a ladder 14. An operator can perform maintenance and repair work in the work area. Furthermore, access to the crushing chamber, to a pre-screen or to a feed chute of the crusher is also provided to remove material jams if necessary or to make mechanical adjustments.

In the front area, the crusher 10 has a motor unit 15. The motor unit 15 comprises an internal combustion engine that supplies power to individual units of the crusher 10. Furthermore, the machine frame 12 has an extension arm 16 at the front end, from which a band conveyor unit 60 is suspended. In the rear end area, the crusher 10 has a feed unit 20 comprising a feed hopper. A conveying device 21, preferably a vibratory conveyor, is also arranged in the area of the feed hopper.

An excavator or any other loading device can be used to feed the material to be shredded into the feed hopper of the feed unit 20. The conveying device 21 transports the rock material to a screening device 30. There, the rock material is subjected to a screening process. The screened fine rock material is of a size that does not require further crushing in the downstream crusher unit 40. This screened fine rock material is typically bypassed past the crusher unit 40 and fed directly to the band conveyor unit 60. The coarse rock fraction that has not been screened out is fed to the crusher unit 40.

In this exemplary embodiment, the crusher unit 40 is designed as a jaw crusher. The coarse rock fraction is broken and crushed in the crusher unit 40. The crushed material falls below the crusher unit 40 onto a crusher discharge conveyor 50. The crusher discharge belt, which is preferably formed by a circulating belt conveyor, conveys the crushed rock material towards the band conveyor unit 60.

The band conveyor unit 60 comprises a band conveyor. This band conveyor is formed by an endless circulating means of conveyance. The band conveyor has a feed end 61 in the area of the crusher discharge belt. The crusher discharge conveyor 50 transfers the rock material to the band conveyor of the band conveyor unit 60 in the area of the feed end. The conveyor then transports the rock material towards a discharge end 62. Here the rock material leaves the band conveyor unit to be heaped onto a pile.

In this exemplary embodiment, an option is shown, in which a cover 63 is used to cover the top of the band conveyor of the band conveyor unit 60 to prevent rock material from accidentally falling off the band conveyor. The cover 63 forms a discharge opening 64 in the area of the discharge end 62.

As FIG. 1 further shows, a magnetic separator 70 is arranged in the area of the feed end 61 of the band conveyor unit 60.

Figure 7:
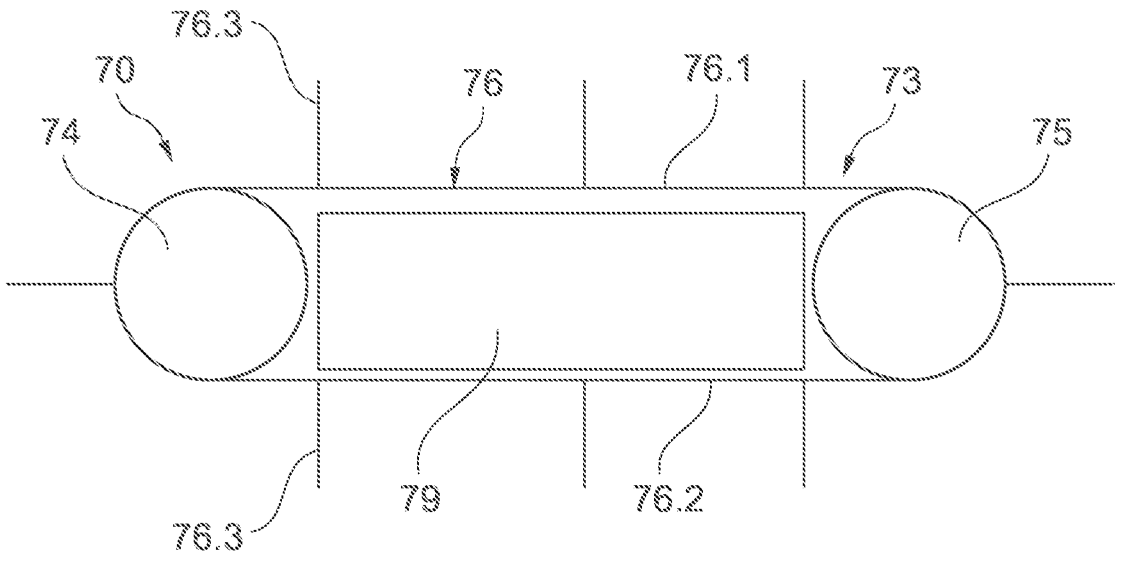

The basic structure of the magnetic separator 70 can be seen in FIG. 7. As this embodiment shows, the magnetic separator 70 has two deflector elements 74, 75, which are spaced apart from each other and have the form of rollers. The axes of rotation of these two rollers are aligned in parallel to each other. The belt conveyor 76 of a conveying device 73 is routed around the deflector elements 74, 75. The belt conveyor 76 has an endless circumferential design. The belt conveyor 76 forms two strands 76.1, 76.2 that are arranged in parallel to each other. A magnet 79 is held between the two strands 76.1, 76.2.

To assist in the conveying action of the belt conveyor 76, ribs 76.3 projecting radially outwardly from the belt conveyor 76 are provided.

Figure 3:
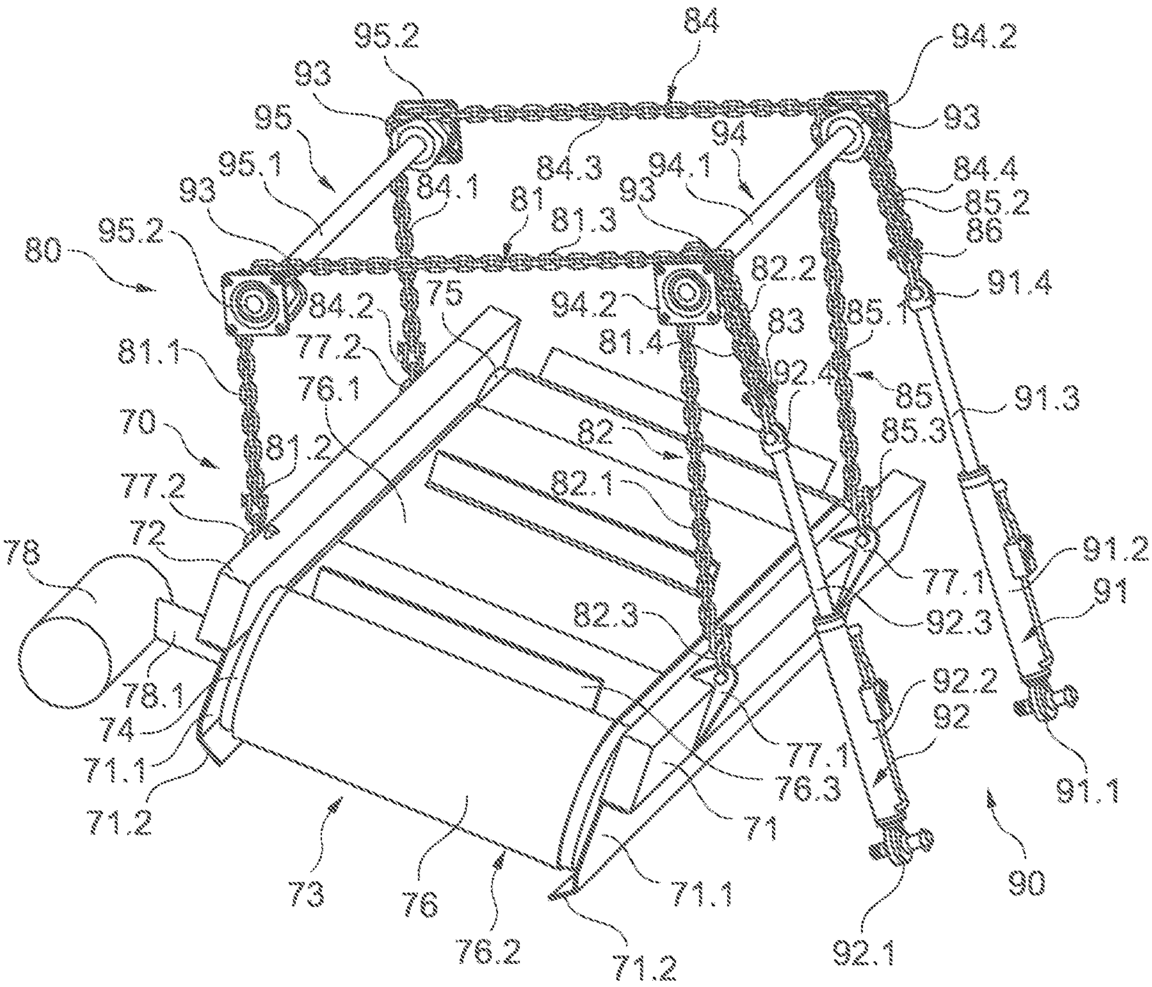
FIG. 3 shows a perspective view of a magnetic separator.

FIG. 3 shows the design of the magnetic separator 70 in more detail. As this Figure shows, the magnetic separator 70 has two supports 71, 72 spaced apart from each other. The deflector elements 74, 75 are rotatably mounted on these supports 71, 72. A motor 78, which may for instance be designed as a hydraulic motor, drives one of the deflector elements 74, 75. A drive shaft 78.1 extends from the motor 78, which is routed to the deflector element 74.

Protection plates 71.1 are provided below the supports 71, 72 to provide lateral protection for the belt conveyor 76. To improve the protective effect of the belt conveyor 76 or the deflector elements 74, 75, the protection plates 71.1 may also have folded edges 71.2.

FIG. 3 further shows that the supports 71, 72 each have two suspensions 77.1, 77.2. The suspensions 77.1, 77.2 may also be referred to as suspension connectors.

Figure 2:
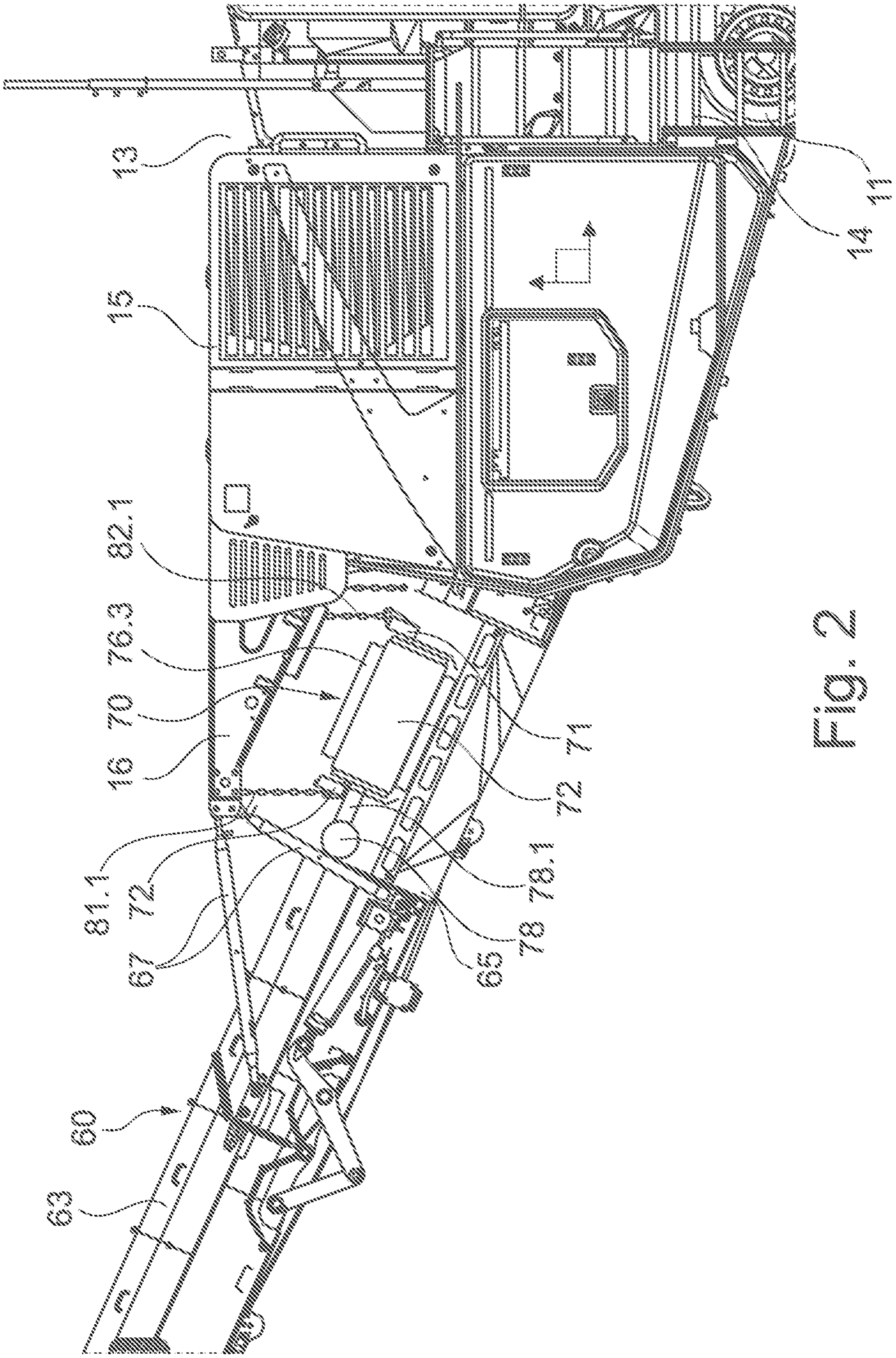
FIG. 2 shows a side view of a detail of the crusher taken from FIG. 1.

FIG. 2 shows the installation position of the magnetic separator 70. As this embodiment shows, the magnetic separator 70 is arranged above the band conveyor in a direction opposite to the direction of gravity.

An adjustment unit 80, which is shown in detail in FIG. 3, is used to secure the position of the magnetic separator 70. The adjustment unit 80 has four ties 81, 82, 84 and 85. The ties 81, 82, 84, 85 are formed by limp elements, in this exemplary embodiment by round-link chains. The two ties 81 and 84 are attached to the rear support 72, in the conveying direction of the band conveyor, at the rear suspensions 77.2. Coupling elements 81.2, 84.2 are used for this purpose. The coupling elements 81.2, 84.2 can be designed as shackles. The ties 81, 82, 84 and 85 may also be referred to as flexible ties.

The two further ties 82 and 85 are attached to the front support 71, in the conveying direction of the band conveyor, at the front suspensions 77.1. Again, corresponding coupling elements 82.3, 85.3 are used.

The two ties 82 and 85, which are spaced apart transversely to the conveying direction of the band conveyor, are each routed to a deflector 93, starting from the front suspensions 77.1, forming one tension strand each 82.1, 85.1.

Figure 4:
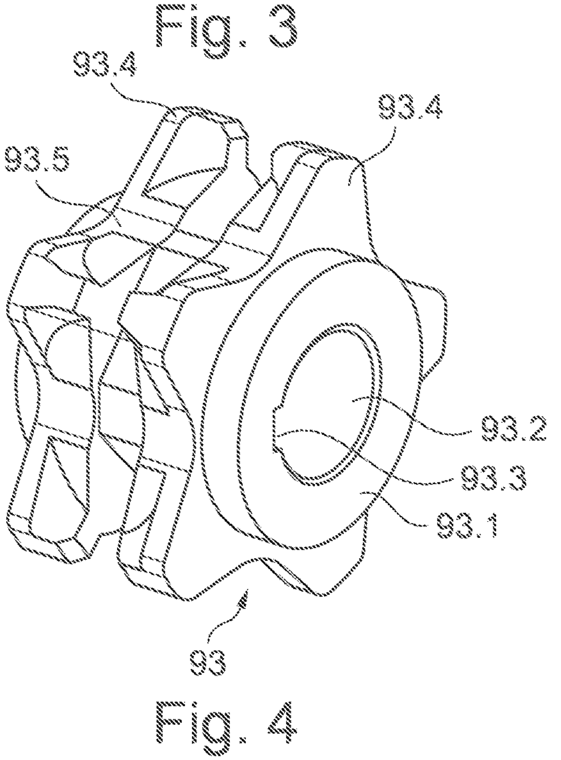
FIG. 4 shows a perspective view of a deflector of the magnetic separator of FIG. 3.

The deflectors 93 are formed by gears, which may be sprockets for link-chains as in this case. The design of the sprockets for link-chains is illustrated by way of example in FIG. 4. As FIG. 4 shows, the deflector 93 has a hub 93.1. The hub 93.1 is penetrated by a bore 93.2. A notch 93.3 is provided in the area of the bore 93.2, into which notch a feather key fits. Two gear segments 93.4 are formed on the hub 93.1. The gear segments 93.4 are spaced apart from each other in the direction of the central longitudinal axis of the bore 93.2. Grooves 93.5 are formed between the teeth 93.4. The grooves 93.5 are shaped and dimensioned to hold a chain link of the assigned tie 81, 82, 84, 85 such that this chain link is positively locked in the direction of the longitudinal extension of the ties 81, 82, 84, 85.

A synchronization means 94 of an actuator unit 90 is arranged above the support 71. The synchronizing means 94 comprises a shaft 94.1. This shaft 94.1 is rotatably mounted at its two longitudinal ends by means of one bearing part 94.2 each. The bearing components 94.2 may be attached to the boom 16 of the crusher 10.

Two of the deflectors 93 are installed at each of the two longitudinal ends of the shaft 94.1. To this end, the shaft 94.1 is inserted through the bores 93.2. The deflectors 93 are secured for co-rotation by means of a feather key which is effective between the notch 93.3 of the deflectors 93 and the shaft 94.1. A suitable stop connection, for instance a stop shoulder, is used to secure the deflectors 93 to the shaft 94. It is also conceivable to weld or clamp the deflectors 93 to the shaft 94. Then a feather key and stop shoulder are not required.

Then the two ties 82 and 85 are routed to the two tension strands 82.1 and 85.1 each via a deflector 93. Beyond the deflectors 93, the ties 82, 85 have retaining segments 82.2, 85.2. The end of this retaining segment 82.2, 85.2 is connected to a connector 83, 86. The connector 83, 86 may again be formed by a shackle. The connectors 83, 86 provides a connection to a mounts 91.4, 92.4 of actuators 91, 92 of the actuator unit 90.

In the context of the invention, the actuators 91, 92 may be formed by hydraulic cylinders. For instance, the actuators 91, 92 may also be of identical design, reducing the number of parts required.

For instance, the actuators 91, 92 may comprise cylinders 91.2, 92.2. Pistons are adjustably guided in the cylinders 91.2, 92.2. Piston rods 91.3, 92.3 are connected to the pistons. The mounts 91.4, 92.4 are arranged at the free ends of the piston rods 91.3, 92.3. The cylinder 91.2, 92.2 has a holder 91.1, 92.1 facing away from the piston rods 91.3, 92.3. This holder 91.1, 92.1 can be used to secure the cylinder 91.2, 92.2 to the machine frame 12.

FIG. 3 further shows that the two ties 81 and 84 are attached to the rear support 72 in the transport direction of the band conveyor (rear suspensions 77.2). The tension strands 81.1 and 84.1 of the two ties 81 and 84 extend upwards from the support 72. The tension strands 81.1 and 84.1 are again routed to the deflectors 93, the shape of which can also be seen in FIG. 4.

The deflectors 93 are again part of a synchronization means 95. According to the above embodiments, the deflectors 93 are coupled to a shaft 95.1 of the synchronization means 95 for co-rotation. The design of the synchronizing means 95 is largely similar to the design of the synchronizing means 94 described above, i.e., reference can be made to the above explanations to avoid repetition. Again, bearing parts 95.2 are provided for the shaft 95.1, which bearing parts can be bolted to the boom 16.

The tension strands 81.1 and 84.1 are routed around the deflectors 93 and, beyond the deflectors 93, the ties 81 and 84 form synchronization means 81.3 and 84.3. I.e., these synchronization means 81.3, 84.3 are formed by segments of the ties 81 and 84 used as chains.

The synchronization means 81.3 and 84.3 transition into the retaining segments 81.4 and 84.4, respectively. At their longitudinal ends, the retaining segments 84.4 and 81.4 are each connected to mounts 92.4, 91.4 of actuators 92, 91. Preferably, the same connector 83, 86, which is used for coupling the ties 82 and 85, is also used for securing. Then, the traction means 82 and 81 are secured to the connector 83 and the ties 84 and 85 are secured to the connector 86.

To reduce the number of parts required, it may be provided in particular in the context of the invention that all the ties 81, 82, 84, 85 are formed by chains of identical design.

FIG. 3 shows the magnetic separator 70 in its lowermost position. Accordingly, the bottom strand 76.2 of the belt conveyor 76 is closely assigned to the band conveyor of the band conveyor unit 60. If the magnetic separator 70 is now to be spaced further apart from the band conveyor, the actuators 91 and 92 will be activated, for instance by pressurizing a hydraulic fluid. Then the pistons in the cylinders 91.2, 92.2 travel such that the piston rods 91.3, 92.3 move continuously into the cylinders 91.2, 92.2. As a result of this motion, tension is applied to the connectors 83, 86 of the four ties 81, 82, 84, 85. In this case, the motions of the ties 82 and 85 are positively synchronized with each other via the deflectors 93 and the shaft 94.1 of the synchronization means 94.

The associated deflector elements 93 of the front synchronization means 94 and the synchronization means 81.3 of the tie 81 are used to motion-synchronize the motion of the first tension strand 81.1 of the tie 81 with the motion of the first tension strand 82.1 of the tie 82. In this case, the two deflector elements 93 may in particular be formed by two sprockets for link-chains, which are interconnected for co-rotation and which are preferably arranged directly adjacent to each other.

The associated deflector elements 93 of the front synchronization means 94 and the synchronization means 84.3 of the tie 84 are used to motion-synchronize the motion of the first tension strand 84.1 of the tie 81 with the motion of the first tension strand 85.1 of the tie 85. In this case, the two deflector elements 93 may in particular be formed by two sprockets for link-chains, which are interconnected for co-rotation and which are preferably arranged directly adjacent to each other.

According to the present embodiment of the invention, moreover, the two ties 81 and 84 are synchronized in motion via the rear synchronization means 95 by means of the deflectors 93 and the shaft 95.1.

Obviously, this synchronization using the synchronization means is not essential, because the motion of the two traction means 81, 84 has been synchronized with the motion of the traction means 82 and 85 via the front synchronization means 94. However, in the variant shown in FIG. 3, improved guidance can be achieved, resulting in a reliable operation.

In summary, the ties 81, 82, 84, 85 are motion-synchronized with each other. Accordingly, the suspensions 77.1, 77.2 can be interadjusted in a synchronized manner, in particular they can be raised or lowered.

During operation, the crushed rock material passes onto the band conveyor of the band conveyor unit 60. The band conveyor, driven by the conveyor motor 66 via a drive shaft 66.1, then continuously conveys the rock material towards the discharge end 62. The rock material is transported past the magnetic separator 70 on its way from the feed end 61 to the discharge end 62.

If then ferromagnetic material is present in the extracted rock material, for instance steel reinforcement, it will be attracted to the magnet 79 of the magnetic separator 70. This ferrous material then adheres to the belt conveyor 76 in the area of the bottom strand 76.2. The belt conveyor 76, due to its circulating motion, conveys this ferrous material to the deflector element 74, 75 against which the bottom strand runs. As soon as this ferrous material then enters the area of the deflector element 74 or 75, the distance between the ferrous material and the magnet 76 increases. This terminates the magnetic connection and the removed ferrous material passes onto a guide element 65 (see FIGS. 1 and 2). The ferrous material then slides along this guide element 65 and falls alongside the crusher 10.

If a jam now occurs at the magnetic separator 70, for instance if a lot of ferrous material has to be separated at the same time, then the magnetic separator 70 can compensate for the force effects occurring due to the jam in an oscillating manner because of the limp ties 81, 82, 84, 85 in the area of the tension strands 81.1, 84.1,2 and 80.1, 85.1. Reliable operation is maintained in this way.

Figure 5:
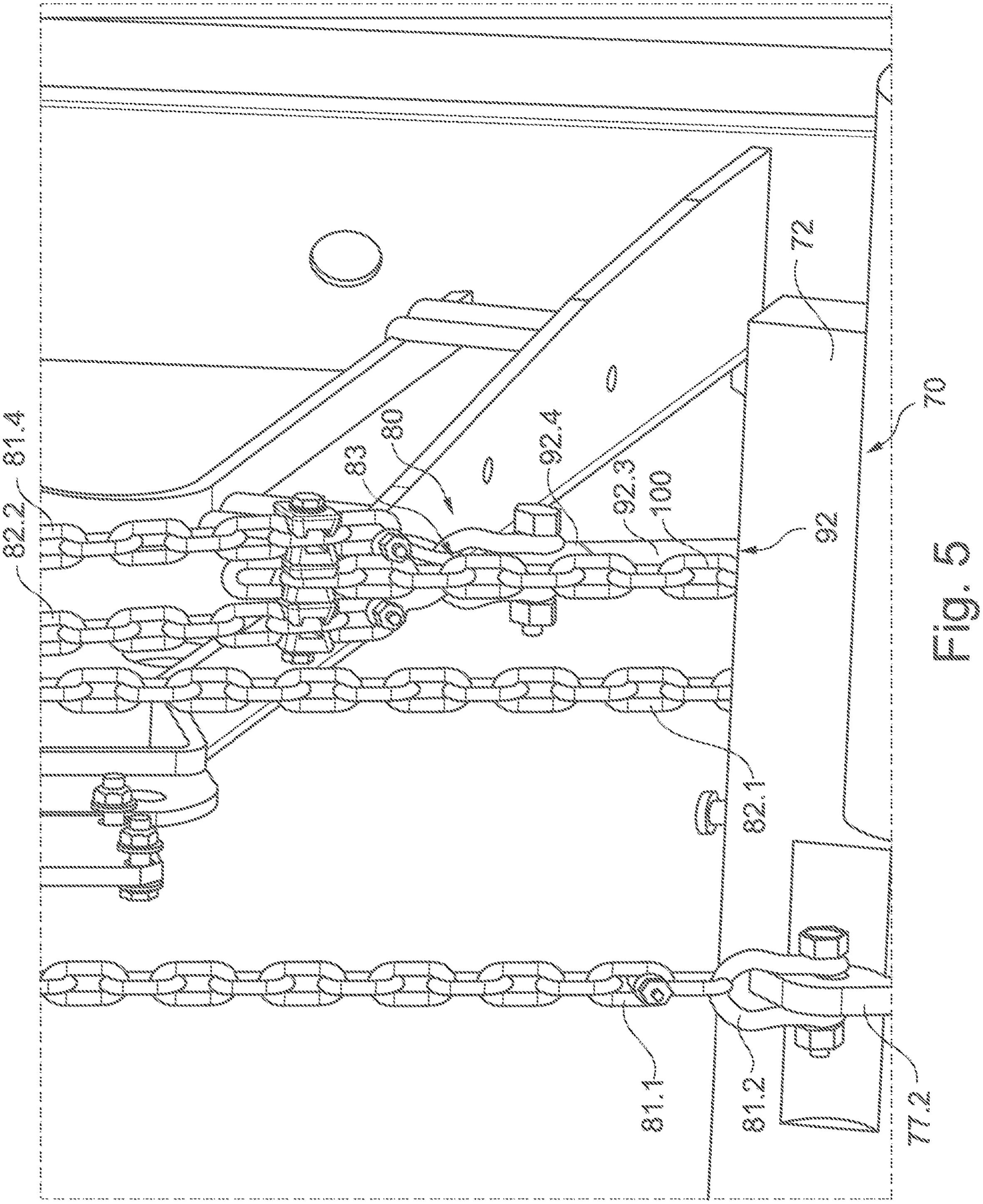
FIG. 5 shows an enlarged detailed perspective view of the crusher of FIG. 1.

As can be seen in FIG. 5, the adjustment position of the magnetic separator 70, which is adjusted by the actuator unit 90 and synchronized using the adjustment unit 80, can be located. For this purpose, a locating element 100, for instance in the form of a chain, is used.

Figure 6:
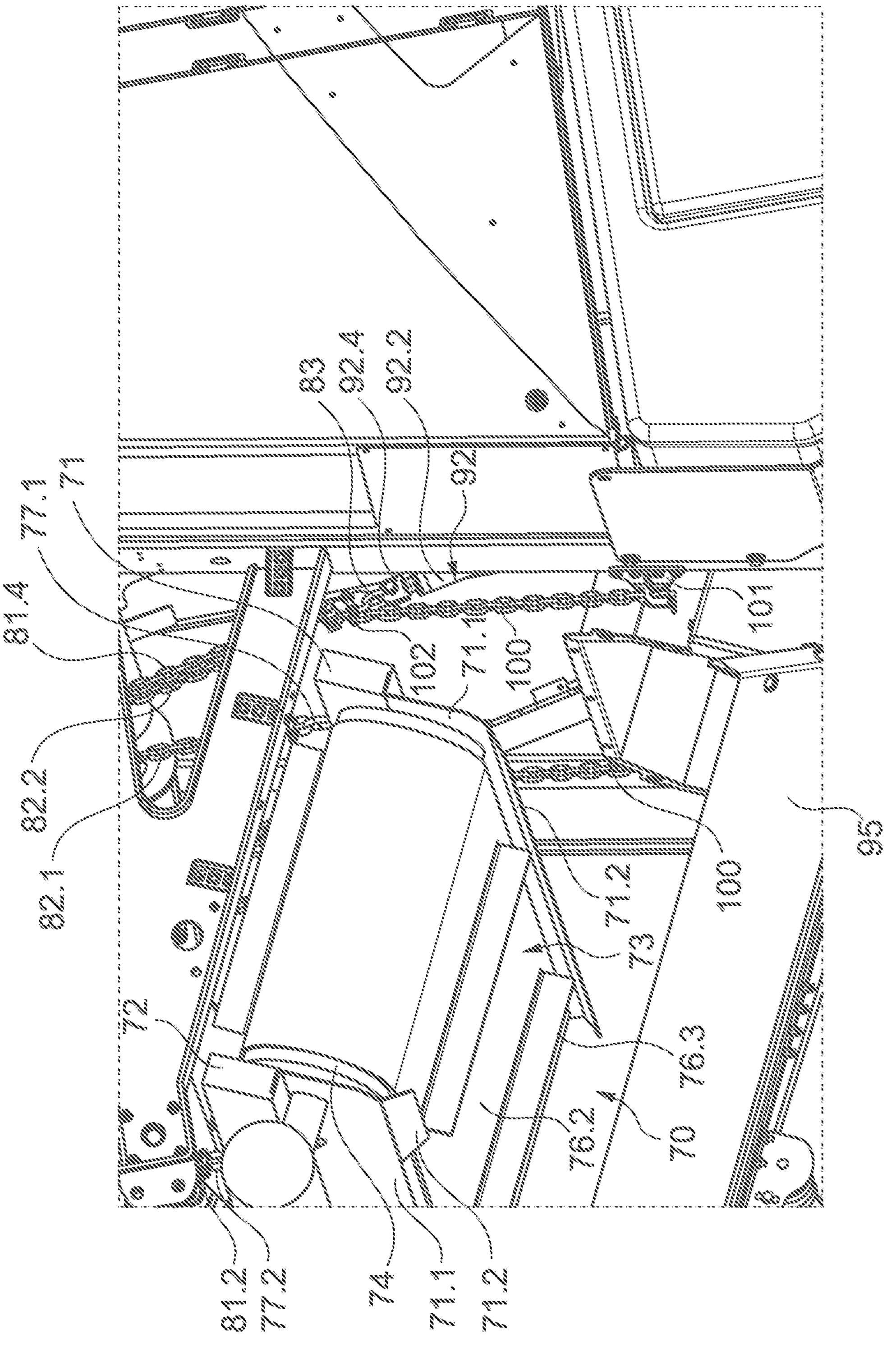
FIG. 6 shows a detailed perspective view of the magnetic separator of the crusher from below and FIG. 7 shows a side view of a magnetic separator as a schematic functional diagram.

FIG. 6 shows that the locating means 100 can be coupled, for instance, using its one end 102, to the connector 83. The other end of the locating element 100 may be fitted to a locking element 101. The locking element 101 is secured to the machine frame 12. The locating element 100 can be used not only to additionally secure the positions of the magnetic separator 70, but also to unload the actuators 91, 92 of the actuator unit 90.

The above explanations illustrate that according to the invention, the crusher 10 is equipped with a crusher unit 40, wherein a band conveyor unit 60 having an endlessly circulating band conveyor is assigned to the crusher unit. The magnetic separator 70 and its magnet 79 are held in the area of the band conveyor unit 60 above the band conveyor in the direction opposite from the direction of gravity. The adjustment unit 80 permits a change of height of the magnet 79 above the band conveyor.

The magnetic separator 70 is suspended from at least two limp ties 81, 82, 84, 85 and these limp ties 81, 82, 84, 85 can be adjusted by means of at least one actuator unit 90 to change the height of the magnet 79.

LIST OF THE REFERENCE NUMERALS

10 Crusher
11 Chassis
12 Machine frame
13 Driver's cab
14 Ladder
15 Motor unit
16 Boom
20 Feed unit
21 Conveying device
30 Screen device
40 Crusher unit
50 Crusher discharge conveyor
60 Band conveyor unit
61 Feed end
62 Discharge end
63 Cover
64 Discharge opening
65 Guide element
66 Conveyor motor
66.1 Drive shaft
70 Magnetic separator
71 Support
71.1 Protection plate
71.2 Folded edges
72 Support
73 Conveyor
74 Deflection element
75 Deflection element
76 Belt conveyor
76.1 Strand
76.2 Strand
76.3 Rib
77.1 Suspension or suspension connector
77.2 Suspension or suspension connector
78 Motor
78.1 Shaft
79 Magnet
80 Adjustment unit
81 Tie
81.1 1. Tension strand
81.2 Coupling element
81.3 Synchronization means
81.4 Retaining segment
82 Tie
82.1 Tension strand
82.2 Retaining segment
82.3 Coupling element
83 Connector
84 Tie
84.1 Tension strand
84.2 Coupling element
84.3 Synchronization means
84.4 Retaining segment
85 Tie
85.1. Tension strand
85.2 Retaining segment
85.3 Coupling element
86 Connector
90 Actuator unit
91 Actuator
91.1 Holder
91.2 Cylinder
91.3 Piston rod
91.4 Mount
92 Actuator
92.1 Holder
92.2 Cylinder
92.3 Piston rod
92.4 Mount
93 Deflector
93.1 Hub
93.2 Bore
93.3 Notch
93.4 Sprocket segment
93.5 Groove
94 Synchronization means
94.1 Shaft
94.2 Bearing part
95 Synchronization means
95.1 Shaft
95.2 Bearing part
100 Locating element
101 Locking element
102 End

The invention claimed is:

1. A rock crusher, comprising:

a crusher unit;

a band conveyor unit arranged to convey crushed rock directly or indirectly from the crusher unit, the band conveyor unit including an endlessly circulating band conveyor;

a magnetic separator held above the band conveyor in a direction opposite from a direction of gravity, the magnetic separator including a magnet and first and second spaced suspension connectors; and an adjustment unit including:

at least two flexible ties suspending the magnetic separator above the band conveyor, the at least two flexible ties including first and second flexible ties; and at least one actuator configured to adjust the flexible ties to change a height of the magnetic separator above the band conveyor;

wherein the at least two flexible ties are coupled together for synchronized motion when the at least two flexible ties are adjusted by the at least one actuator; and wherein the adjustment unit includes at least two rotatably mounted deflectors about which the at least two flexible ties are routed to synchronize the motion of the two flexible ties when the at least two flexible ties are adjusted by the at least one actuator, the at least two rotatably mounted deflectors including first and second rotatably mounted deflectors coupled to each other for synchronized rotation;

wherein the first flexible tie includes a first tension strand connected to the first suspension connector using a first coupling element, the first flexible tie being routed around the first deflector, and the first tension strand merging into a first retaining segment of the first flexible tie beyond the first deflector;

wherein the second flexible tie includes a second tension strand connected to the second suspension connector using a second coupling element, the second flexible tie being routed around the second deflector, and the second tension strand merging into a second retaining segment of the second flexible tie beyond the second deflector; and wherein at least one of the first and second retaining segments is connected to the at least one actuator.

2. The rock crusher of claim 1, wherein:

the adjustment unit includes a shaft, and the first and second rotatable deflectors are attached to the shaft for synchronized rotation with the shaft.

3. The rock crusher of claim 1, wherein:

the at least two suspension connectors are spaced from each other transversely to a conveying direction of the band conveyor.

4. The rock crusher of claim 3, wherein:

the magnetic separator includes at least two suspension connectors spaced from each other in the conveying direction of the band conveyor, each of the suspension connectors being connected to one of the flexible ties.

5. The rock crusher of claim 1, wherein:

the at least two suspension connectors are spaced from each other in a conveying direction of the band conveyor.

6. The rock crusher of claim 1, wherein:

at least two of the at least two flexible ties are connected by a common connector to the at least one actuator.

7. The rock crusher of claim 1, wherein:

the at least one actuator is a hydraulic rotary actuator.

8. The rock crusher of claim 1, wherein:

the at least one actuator is an electric rotary drive actuator or an electric linear drive actuator.

9. The rock crusher of claim 1, wherein:

the at least two flexible ties are formed by roller chains or round link chains; and the at least two rotatably mounted deflectors are sprockets.

10. The rock crusher of claim 1, wherein the magnetic separator comprises:

two supports arranged at a distance from each other in a conveying direction of the band conveyor;

at least two rollers mounted on the supports;

an endlessly circulating belt conveyor mounted on the rollers such that a transport direction of the belt conveyor extends transversely to the conveying direction of the band conveyor, the belt conveyor forming two strands; and wherein the magnet is arranged between the two strands of the belt conveyor.

11. The rock crusher of claim 1, wherein:

the adjustment unit includes at least one shaft or roller on which the at least two flexible ties can be wound.

12. The rock crusher of claim 11, wherein:

the at least one shaft or roller includes two shafts or rollers on each of which one of the flexible ties can be wound.

13. A rock crusher, comprising:

a crusher unit;

a band conveyor unit arranged to convey crushed rock directly or indirectly from the crusher unit, the band conveyor unit including an endlessly circulating band conveyor;

a magnetic separator held above the band conveyor in a direction opposite from a direction of gravity, the magnetic separator including a magnet; and an adjustment unit including:

at least two flexible ties suspending the magnetic separator above the band conveyor; and at least one actuator configured to adjust the flexible ties to change a height of the magnetic separator above the band conveyor;

wherein the at least two flexible ties are coupled together for synchronized motion when the at least two flexible ties are adjusted by the at least one actuator;

wherein the adjustment unit includes at least two rotatably mounted deflectors about which the at least two flexible ties are routed to synchronize the motion of the two flexible ties when the at least two flexible ties are adjusted by the at least one actuator; and wherein the adjustment unit includes a strand segment of one of the flexible ties, the strand segment running between the first and second rotatable deflectors to synchronize the rotation of the rotatable deflectors.

14. A rock crusher, comprising:

a crusher unit;

a band conveyor unit arranged to convey crushed rock directly or indirectly from the crusher unit, the band conveyor unit including an endlessly circulating band conveyor;

a magnetic separator held above the band conveyor in a direction opposite from a direction of gravity, the magnetic separator including a magnet; and an adjustment unit including:

at least two flexible ties suspending the magnetic separator above the band conveyor; and at least one actuator configured to adjust the flexible ties to change a height of the magnetic separator above the band conveyor;

wherein the at least one actuator is a linear hydraulic actuator including a cylinder, a piston guided in the cylinder, and a piston rod connected to the piston; and wherein the piston rod or the cylinder is connected to the at least two flexible ties so that the at least two flexible ties move linearly with the piston rod or the cylinder.

15. A rock crusher, comprising:

a crusher unit;

a band conveyor unit arranged to convey crushed rock directly or indirectly from the crusher unit, the band conveyor unit including an endlessly circulating band conveyor;

a magnetic separator held above the band conveyor in a direction opposite from a direction of gravity, the magnetic separator including a magnet; and an adjustment unit including:

at least four flexible ties suspending the magnetic separator above the band conveyor; and at least two actuators configured to adjust the flexible ties to change a height of the magnetic separator above the band conveyor, each actuator being coupled to a different pair of the flexible ties;

wherein the at least four flexible ties are coupled together for synchronized motion when the at least four flexible ties are adjusted by the at least two actuators.

16. The rock crusher of claim 15, wherein:

the two actuators are synchronized with each other.

17. A rock crusher, comprising:

a crusher unit;

a band conveyor unit arranged to convey crushed rock directly or indirectly from the crusher unit, the band conveyor unit including an endlessly circulating band conveyor;

a magnetic separator held above the band conveyor in a direction opposite from a direction of gravity, the magnetic separator including a magnet;

an adjustment unit including:

at least two flexible ties suspending the magnetic separator above the band conveyor; and at least one actuator configured to adjust the flexible ties to change a height of the magnetic separator above the band conveyor;

a machine frame; and a locating element in the form of a chain attached to the magnetic separator and adjustably attached to the machine frame.

* * * * *